(12) United States Patent
Agarwal et al.

(10) Patent No.: US 7,256,228 B2
(45) Date of Patent: Aug. 14, 2007

(54) STABILIZED POLYCARBONATE POLYESTER COMPOSITION

(75) Inventors: Parminder Agarwal, Evansville, IN (US); Peter H. Th. Vollenberg, Evansville, IN (US); Gabrie Hoogland, Breda (NL); Vishvajit Chandrakant Juikar, Karnataka (IN); Ganesh Kannan, Karnataka (IN); Abbas-Alli Ghudubhai Shaikh, Bangalore (IN); Sachin Ashok Shelukar, Karnataka (IN)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/814,971

(22) Filed: Mar. 31, 2004

(65) Prior Publication Data

US 2005/0113534 A1    May 26, 2005

Related U.S. Application Data

(60) Provisional application No. 60/524,148, filed on Nov. 21, 2003.

(51) Int. Cl.
*C08L 69/00* (2006.01)
*C08L 67/02* (2006.01)

(52) U.S. Cl. ............ 524/128; 524/135; 524/140; 524/147; 524/148; 524/222; 524/238; 524/291; 524/310; 524/320; 524/386; 524/387; 524/414; 524/417; 525/133; 525/148; 525/439

(58) Field of Classification Search .......... None
See application file for complete search history.

(56) References Cited

U.S. PATENT DOCUMENTS 5,118,726 A * 6/1992 Mizutani et al. .......... 523/136
5,538,821 A * 7/1996 Kakinuma et al. ........ 430/18
5,674,928 A * 10/1997 Chisholm et al. ......... 524/147
5,814,712 A * 9/1998 Gallucci et al. .......... 525/436
2002/0128357 A1* 9/2002 Goossens et al. ........ 524/115

FOREIGN PATENT DOCUMENTS

| EP | 0272417 A2 | | 6/1988 |
| EP | 0273149 A2 | | 7/1988 |
| EP | 774491 | * | 5/1997 |
| JP | 04309552 | * | 11/1992 |
| JP | 10036647 | * | 2/1998 |
| WO | 91/05820 | | 5/1991 |
| WO | 0238675 A2 | | 5/2002 |

* cited by examiner

*Primary Examiner*—David J. Buttner
(74) *Attorney, Agent, or Firm*—Marina Larson & Associates, LLC

(57) ABSTRACT

A stabilized thermoplastic resin composition is disclosed which comprises structural units derived at least one substituted or unsubstituted polycarbonate, at least one substituted or unsubstituted polyester and a combination of at least two quenchers, wherein said quencher is selected from a group consisting of phosphorus compound, carboxylic acid, derivates of carboxylic acids, epoxy functional polymers and boron compound. Also disclosed is a stabilized thermoplastic resin composition comprising: structural units derived at least one substituted or unsubstituted polycarbonate, at least one substituted or unsubstituted polyester, an epoxy functional polymers and a combination of at least one quenchers, wherein said quencher is selected from a group consisting of phosphorus compounds, carboxylic acid compounds, polyols, and boron compounds. In addition the composition disclosed possess good optical properties, thermal properties and stability.

34 Claims, No Drawings

STABILIZED POLYCARBONATE POLYESTER COMPOSITION

CROSS REFERENCE TO RELATED APPLICATIONS

This application claims priority to U.S. Provisional Application Ser. No. 60/524,148 filed on Nov. 21, 2003, which is incorporated herein by reference in its entirety

BACKGROUND OF THE INVENTION

This invention relates to a stabilized thermoplastic resin composition, a method to synthesize the composition and articles made from the compositions.

Polycarbonate is a useful engineering plastic for parts requiring clarity, high toughness, and, in some cases, good heat resistance. However, polycarbonate also has some important deficiencies, among them poor chemical and stress crack resistance, poor resistance to sterilization by gamma radiation, and poor processability. Blends of polyesters with polycarbonates provide thermoplastic compositions having improved properties over those based upon either of the single resins alone. Moreover, such blends are often more cost effective than polycarbonate alone. The miscibility of PC with the polyesters gives the blends the clarity needed, but this is restricted to (semi)aliphatic polyesters such as poly(cyclohexane dimethanol cyclohexane dicarboxylate) (PCCD) or a glycolized copolyester such as polyethylene glycol cyclohexane dimethanol terephthalate (PCTG). PCT patent application no. WO 02/38675 discloses a thermoplastic composition comprising PC, PCCD, and an impact modifier.

U.S. Pat. Nos. 4,188,314, 4,125,572; 4,391,954; 4,786,692; 4,897,453, and 5,478,896 relate to blends of an aromatic polycarbonate and poly cyclohexane dimethanol phthalate. U.S. Pat. No. 4,125,572 relates to a blend of polycarbonate, polybutylene terephthalate (PBT) and an aliphatic/cycloaliphatic iso/terephthalate resin. U.S. Pat. No. 6,281,299 discloses a process for manufacturing transparent polyester/polycarbonate compositions, wherein the polyester is fed into the reactor after bisphenol A is polymerized to a polycarbonate.

Moldable crystalline resin compositions such as polycarbonate-polyester blends are desirable for many applications. On exposure to high temperature and humidity, such blends may exhibit relatively poor hydrolytic stability. Another problem associated with these blends is due to ester-carbonate interchange, also known as trans esterification, which may lead to loss of mechanical properties. Catalyst quenchers are typically used to prevent such interchange reactions. However these catalyst quenchers can also promote degradation of polymer chains and contribute to decrease in hydrolytic stability.

Conventionally phosphorus derivatives such as phosphoric acid, phosphates have been used as quenchers. U.S. Pat. Nos. 4,532,290, 4,555,540, 4,401,804, U.S. Pat. No. 20,030, 032,725, describes the phosphorous-containing compounds include phosphoric acid, certain organic phosphorous compounds such as distearyl pentaerythritol diphosphate, mono or dihydogen phosphate are useful in deactivating metallic catalyst residues. The use of phosphite stabilizers is not satisfactory because of the tendency to be unstable to both hydrolysis and oxidation. U.S. Pat. No. 4,452,933 teaches the use of hydroxy or amino substituted carboxylic acid derivatives such as Methyl salicylate, Malic acid, Glycine or dibutyl tartrate to effectively inhibit ester-carbonate interchange reaction. The U.S. Pat. No. 4,560,722 discloses a stabilized polycarbonate polyester blend with boric acid as a stabilizer. EP Patent 02 72417 teaches the use of polyols as a color stabilizer stabilizing the polycarbonate polyester composition.

U.S. Pat. No. 5,087,665 Chung et al. disclose a method of improving the hydrolytic stability of blends of polycarbonate and polyethylene terephthalate, by adding polyethylene to the blends. U.S. Pat. Nos. 5,411,999 and 5,596,049 describe the use of epoxy based material in conjugation with the catalyst quenchers to promote hydrolytic stability. However, a disadvantage is that the epoxy compounds were used in combination with metal catalyst, such as sodium stearate, which in turn may result in loss in polycarbonate molecular weight. U.S. Pat. No. 4,760,107 teaches a addition of a combination of an epoxide with polyols to polycarbonate polyester blends for color retention properties. European Patent Nos. EP 0 273149 and EP 0 497 818, describe additions of epoxy oligomeric materials to certain polyesters, disclose thermal stability in glass reinforced and/or flame-retarded polyester formulations. U.S. Pat. No. 5,300,546 relates to polyester compositions with mineral fillers giving a ceramic feel which have improved hydrolytic stability and melt viscosity stability.

There is a continuing need for polycarbonate polyester blends having a good balance of optical property, processability, solvent resistance and hydrostability in addition to good mechanical and thermal properties.

BRIEF DESCRIPTION OF THE INVENTION

The present inventors have unexpectedly discovered a thermoplastic resin composition comprising structural units derived at least one substituted or unsubstituted polycarbonate, at least one substituted or unsubstituted polyester and a combination of at least two quenchers, wherein said quencher is selected from a group consisting of phosphorus compound, carboxylic acid, derivates of carboxylic acids, epoxy functional polymers and boron compound. Also disclosed is a synthesis method for the optically clear thermoplastic resin compositions of the present invention and articles derived from said composition.

In an embodiment of the present invention discloses a stabilized thermoplastic resin composition comprising: structural units derived from at least one substituted or unsubstituted polycarbonate, at least one substituted or unsubstituted polyester, an epoxy functional polymers and a combination of at least one quenchers, wherein said quencher is selected from a group consisting of phosphorus compounds, carboxylic acid compounds, polyols, and boron compounds. In another embodiment of the present invention the stabilized composition of the present invention has improved properties.

Various other features, aspects, and advantages of the present invention will become more apparent with reference to the following description, examples, and appended claims.

DETAILED DESCRIPTION OF THE INVENTION

The present invention may be understood more readily by reference to the following detailed description of preferred embodiments of the invention and the examples included herein. In this specification and in the claims, which follow, reference will be made to a number of terms which shall be defined to have the following meanings.

The singular forms "a", "an" and "the" include plural referents unless the context clearly dictates otherwise.

"Optional" or "optionally" means that the subsequently described event or circumstance may or may not occur, and that the description includes instances where the event occurs and instances where it does not.

As used herein the term "polycarbonate" refers to polycarbonates incorporating structural units derived from one or more dihydroxy aromatic compounds and includes copolycarbonates and polyester.

As used herein the term "PCCD" is defined as poly (cyclohexane-1,4-dimethylene cyclohexane-1,4-dicarboxylate).

A component of the blend of the invention is an aromatic polycarbonate. The aromatic polycarbonate resins suitable for use in the present invention, methods of making polycarbonate resins and the use of polycarbonate resins in thermoplastic molding compounds are well-known in the art, see, generally, U.S. Pat. Nos. 3,169,121, 4,487,896 and 5,411,999, the respective disclosures of which are each incorporated herein by reference.

Polycarbonates useful in the invention comprise repeating units of the formula (I)

wherein $R^1$ is a divalent aromatic radical derived from a dihydroxyaromatic compound of the formula HO—D—OH, wherein D has the structure of formula:

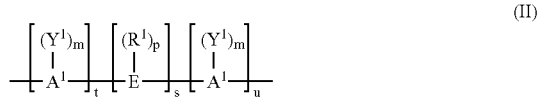

wherein $A^1$ represents an aromatic group including, but not limited to, phenylene, biphenylene, naphthylene, and the like. In some embodiments E may be an alkylene or alkylidene group including, but not limited to, methylene, ethylene, ethylidene, propylene, propylidene, isopropylidene, butylene, butylidene, isobutylidene, amylene, amylidene, isoamylidene, and the like. In other embodiments when E is an alkylene or alkylidene group, it may also consist of two or more alkylene or alkylidene groups connected by a moiety different from alkylene or alkylidene, including, but not limited to, an aromatic linkage; a tertiary nitrogen linkage; an ether linkage; a carbonyl linkage; a silicon-containing linkage, silane, siloxy; or a sulfur-containing linkage including, but not limited to, sulfide, sulfoxide, sulfone, and the like; or a phosphorus-containing linkage including, but not limited to, phosphinyl, phosphonyl, and the like. In other embodiments E may be a cycloaliphatic group including, but not limited to, cyclopentylidene, cyclohexylidene, 3,3,5-trimethylcyclohexylidene, methylcyclohexylidene, 2-[2.2.1]-bicycloheptylidene, neopentylidene, cyclopentadecylidene, cyclododecylidene, adamantylidene, and the like; a sulfur-containing linkage, including, but not limited to, sulfide, sulfoxide or sulfone; a phosphorus-containing linkage, including, but not limited to, phosphinyl or phosphonyl; an ether linkage; a carbonyl group; a tertiary nitrogen group; or a silicon-containing linkage including, but not limited to, silane or siloxy. $R^1$ independently at each occurrence comprises a monovalent hydrocarbon group including, but not limited to, alkenyl, allyl, alkyl, aryl, aralkyl, alkaryl, or cycloalkyl. In various embodiments a monovalent hydrocarbon group of $R^1$ may be halogen-substituted, particularly fluoro- or chloro-substituted, for example as in dichloroalkylidene, particularly gem-dichloroalkylidene. $Y^1$ independently at each occurrence may be an inorganic atom including, but not limited to, halogen (fluorine, bromine, chlorine, iodine); an inorganic group containing more than one inorganic atom including, but not limited to, nitro; an organic group including, but not limited to, a monovalent hydrocarbon group including, but not limited to, alkenyl, allyl, alkyl, aryl, aralkyl, alkaryl, or cycloalkyl, or an oxy group including, but not limited to, $OR^2$ wherein $R^2$ is a monovalent hydrocarbon group including, but not limited to, alkyl, aryl, aralkyl, alkaryl, or cycloalkyl; it being only necessary that $Y^1$ be inert to and unaffected by the reactants and reaction conditions used to prepare the polymer. In some particular embodiments $Y^1$ comprises a halo group or $C_1$-$C_6$ alkyl group. The letter "m" represents any integer from and including zero through the number of replaceable hydrogens on $A^1$ available for substitution; "p" represents an integer from and including zero through the number of replaceable hydrogens on E available for substitution; "t" represents an integer equal to at least one; "s" represents an integer equal to either zero or one; and "u" represents any integer including zero.

In dihydroxy-substituted aromatic hydrocarbons in which D is represented by formula (II) above, when more than one $Y^1$ substituent is present, they may be the same or different. The same holds true for the $R^1$ substituent. Where "s" is zero in formula (II) and "u" is not zero, the aromatic rings are directly joined by a covalent bond with no intervening alkylidene or other bridge. The positions of the hydroxyl groups and $Y^1$ on the aromatic nuclear residues $A^1$ can be varied in the ortho, meta, or para positions and the groupings can be in vicinal, asymmetrical or symmetrical relationship, where two or more ring carbon atoms of the hydrocarbon residue are substituted with $Y^1$ and hydroxyl groups. In some particular embodiments the parameters "t", "s", and "u" each have the value of one; both $A^1$ radicals are unsubstituted phenylene radicals; and E is an alkylidene group such as isopropylidene. In some particular embodiments both $A^1$ radicals are p-phenylene, although both may be o- or m-phenylene or one o- or m-phenylene and the other p-phenylene.

In some embodiments of dihydroxy-substituted aromatic hydrocarbons E may be an unsaturated alkylidene group. Suitable dihydroxy-substituted aromatic hydrocarbons of this type include those of the formula (III):

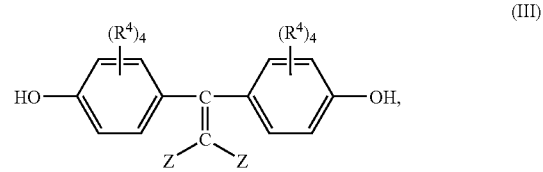

where independently each $R^4$ is hydrogen, chlorine, bromine or a $C_{1-30}$ monovalent hydrocarbon or hydrocarbonoxy group, each Z is hydrogen, chlorine or bromine, subject to the provision that at least one Z is chlorine or bromine.

Suitable dihydroxy-substituted aromatic hydrocarbons also include those of the formula (IV):

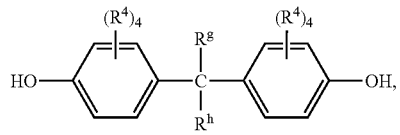

(IV)

where independently each $R^4$ is as defined hereinbefore, and independently Rg and Rh are hydrogen or a C1-30 hydrocarbon group.

In some embodiments of the present invention, dihydroxy-substituted aromatic hydrocarbons that may be used comprise those disclosed by name or formula (generic or specific) in U.S. Pat. Nos. 2,991,273, 2,999,835, 3,028,365, 3,148,172, 3,153,008, 3,271,367, 3,271,368, and 4,217,438. In other embodiments of the invention, dihydroxy-substituted aromatic hydrocarbons comprise bis(4-hydroxyphenyl)sulfide, bis(4-hydroxyphenyl) ether, bis(4-hydroxyphenyl)sulfone, bis(4-hydroxyphenyl)sulfoxide, 1,4-dihydroxybenzene, 4,4'-oxydiphenol, 2,2-bis(4-hydroxyphenyl)hexafluoropropane, 4,4'-(3,3,5-trimethylcyclohexylidene)diphenol; 4,4'-bis(3,5-dimethyl) diphenol, 1,1-bis(4-hydroxy-3-methylphenyl)cyclohexane; 4,4-bis(4-hydroxyphenyl)heptane; 2,4'-dihydroxydipenylmethane; bis(2-hydroxyphenyl)methane; bis(4-hydrocyphenyl)methane; bis(4-hydroxy-5-nitrophenyl)methane; bis(4-hydroxy-2,6-dimethyl-3-methoxyphenyl)methane; 1,1-bis(4-hydroxyphenyl)ethane; 1,2-bis(4-hydroxyphenyl)ethane; 1,1-bis(4-hydroxy-2-chlorophenyl)ethane; 2,2-bis(3-phenyl-4-hydroxyhenyl)propane; 2,2-bis(4-hydroxy-3-methylphenyl)propane; 2,2-bis(4-hydroxy-3-ethylphenyl)propane; 2,2-bis(4-hydroxy-3-isopropylphenyl)propane; 2,2-bis(4-hydroxy-3,5-dimethylphenyl)propane; 3,5,3',5'-tetrachloro-4,4'-dihydroxyphenyl)propane; bis(4-hydroxyphenyl)cyclohexylmethane; 2,2-bis(4-hydroxyphenyl)-1-phenylpropane; 2,4'-dihydroxyphenyl sulfone; dihydroxy naphthalene; 2,6-dihydroxy naphthalene; hydroquinone; resorcinol; C1-3 alkyl-substituted resorcinols; methyl resorcinol, catechol, 1,4-dihydroxy-3-methylbenzene; 2,2-bis(4-hydroxyphenyl)butane; 2,2-bis(4-hydroxyphenyl)-2-methylbutane; 1,1-bis(4-hydroxyphenyl) cyclohexane; 4,4'-dihydroxydiphenyl; 2-(3-methyl-4-hydroxyphenyl-2-(4-hydroxyphenyl)propane; 2-(3,5-dimethyl-4-hydroxyphenyl)-2-(4-hydroxyphenyl)propane; 2-(3-methyl-4-hydroxyphenyl)-2-(3,5-dimethyl-4-hydroxyphenyl)propane; bis(3,5-dimethylphenyl-4-hydroxyphenyl)methane; 1,1-bis(3,5-dimethylphenyl-4-hydroxyphenyl) ethane; 2,2-bis(3,5-dimethylphenyl-4-hydroxyphenyl) propane; 2,4-bis(3,5-dimethylphenyl-4-hydroxyphenyl)-2-methylbutane; 3,3-bis(3,5-dimethylphenyl-4-hydroxyphenyl)pentane; 1,1-bis(3,5-dimethylphenyl-4-hydroxyphenyl)cyclopentane; 1,1-bis(3,5-dimethylphenyl-4-hydroxyphenyl)cyclohexane; bis(3,5-dimethyl-4-hydroxyphenyl) sulfoxide, bis(3,5-dimethyl-4-hydroxyphenyl) sulfone and bis(3,5-dimethylphenyl-4-hydroxyphenyl)sulfide. In a particular embodiment the dihydroxy-substituted aromatic hydrocarbon comprises bisphenol A.

In some embodiments of dihydroxy-substituted aromatic hydrocarbons when E is an alkylene or alkylidene group, said group may be part of one or more fused rings attached to one or more aromatic groups bearing one hydroxy substituent. Suitable dihydroxy-substituted aromatic hydrocarbons of this type include those containing indane structural units such as represented by the formula (V), which compound is 3-(4-hydroxyphenyl)-1,1,3-trimethylindan-5-ol, and by the formula (VI), which compound is 1-(4-hydroxyphenyl)-1,3,3-trimethylindan-5-ol:

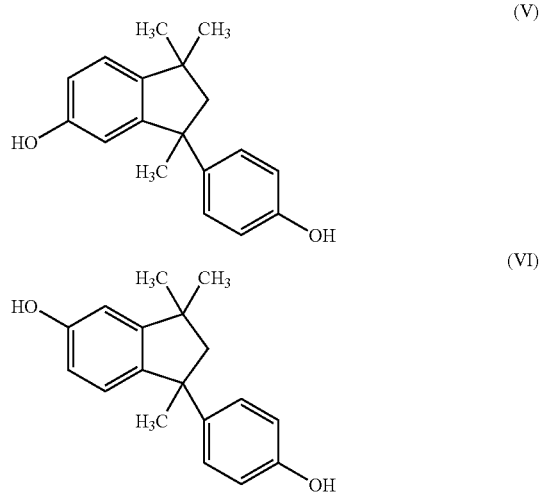

Also included among suitable dihydroxy-substituted aromatic hydrocarbons of the type comprising one or more alkylene or alkylidene groups as part of fused rings are the 2,2,2',2'-tetrahydro-1,1',spirobi[1H-indene]diols having formula (VII):

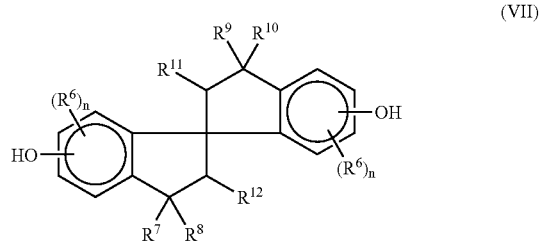

(VII)

wherein each R6 is independently selected from monovalent hydrocarbon radicals and halogen radicals; each R7, R8, R9, and R10 is independently C1-6 alkyl; each R11 and R12 is independently H or C1-6 alkyl; and each n is independently selected from positive integers having a value of from 0 to 3 inclusive. In a particular embodiment the 2,2,2',2'-tetrahydro-1,1'-spirobi[1H-indene]diol is 2,2,2',2'-tetrahydro-3,3,3',3'-tetramethyl-1,1'-spirobi[1H-indene]-6,6'-diol (sometimes known as "SBI"). Mixtures of alkali metal salts derived from mixtures of any of the foregoing dihydroxy-substituted aromatic hydrocarbons may also be employed.

The term "alkyl" as used in the various embodiments of the present invention is intended to designate both linear alkyl, branched alkyl, aralkyl, cycloalkyl, bicycloalkyl, tricycloalkyl and polycycloalkyl radicals containing carbon and hydrogen atoms, and optionally containing atoms in addition to carbon and hydrogen, for example atoms selected from Groups 15, 16 and 17 of the Periodic Table. The term "alkyl" also encompasses that alkyl portion of alkoxide groups. In various embodiments normal and branched alkyl radicals are those containing from 1 to about 32 carbon atoms, and include as illustrative non-limiting examples C1-C32 alkyl optionally substituted with one or more groups selected from C1-C32 alkyl, C3-C15 cycloalkyl or aryl; and C3-C15 cycloalkyl optionally substituted with one or more groups selected from C1-C32 alkyl. Some particular illustrative examples comprise methyl, ethyl, n-propyl, isopropyl, n-butyl, sec-butyl, tertiary-butyl, pentyl, neopentyl, hexyl, heptyl, octyl, nonyl, decyl, undecyl and dodecyl. Some illustrative non-limiting examples of cycloalkyl and bicycloalkyl radicals include cyclobutyl, cyclopentyl, cyclohexyl, methylcyclohexyl, cycloheptyl, bicycloheptyl and adamantyl. In various embodiments aralkyl radicals are those containing from 7 to about 14 carbon atoms; these include, but are not limited to, benzyl, phenylbutyl, phenylpropyl, and phenylethyl. In various embodiments aryl radicals used in the various embodiments of the present invention are those substituted or unsubstituted aryl radicals containing from 6 to 18 ring carbon atoms. Some illustrative non-limiting examples of these aryl radicals include C6-C15 aryl optionally substituted with one or more groups selected from C1-C32 alkyl, C3-C15 cycloalkyl or aryl. Some particular illustrative examples of aryl radicals comprise substituted or unsubstituted phenyl, biphenyl, toluyl and naphthyl.

Mixtures comprising two or more hydroxy-substituted hydrocarbons may also be employed. In some particular embodiments mixtures of at least two monohydroxy-substituted alkyl hydrocarbons, or mixtures of at least one monohydroxy-substituted alkyl hydrocarbon and at least one dihydroxy-substituted alkyl hydrocarbon, or mixtures of at least two dihydroxy-substituted alkyl hydrocarbons, or mixtures of at least two monohydroxy-substituted aromatic hydrocarbons, or mixtures of at least two dihydroxy-substituted aromatic hydrocarbons, or mixtures of at least one monohydroxy-substituted aromatic hydrocarbon and at least one dihydroxy-substituted aromatic hydrocarbon, or mixtures of at least one monohydroxy-substituted alkyl hydrocarbon and at least one dihydroxy-substituted aromatic hydrocarbon may be employed.

In yet another, the polycarbonate resin is a linear polycarbonate resin that is derived from bisphenol A and phosgene. In an alternative embodiment, the polycarbonate resin is a blend of two or more polycarbonate resins.

The aromatic polycarbonate may be prepared in the melt, in solution, or by interfacial polymerization techniques well known in the art. For example, the aromatic polycarbonates can be made by reacting bisphenol-A with phosgene, dibutyl carbonate or diphenyl carbonate. Such aromatic polycarbonates are also commercially available. In one embodiment, the aromatic polycarbonate resins are commercially available from General Electric Company, e.g., LEXAN™ bisphenol A-type polycarbonate resins.

The preferred polycarbonates are preferably high molecular weight aromatic carbonate polymers have an intrinsic viscosity (as measured in methylene chloride at 25° C.) ranging from about 0.30 to about 1.00. deciliters per gram. Polycarbonates may be branched or unbranched and generally will have a weight average molecular weight of from about 10,000 to about 200,000, preferably from about 20,000 to about 100,000 as measured by gel permeation chromatography. It is contemplated that the polycarbonate may have various known end groups.

In one embodiment the optically clear thermoplastic composition comprises polyesters. Methods for making polyester resins and the use of polyester resins in thermoplastic molding compositions are known in the art. Conventional polycondensation procedures are described in the following, see, generally, U.S. Pat. Nos. 2,465,319, 5,367,011 and 5,411,999, the respective disclosures of which are each incorporated herein by reference.

Typically polyester resins include crystalline polyester resins such as polyester resins derived from an aliphatic or cycloaliphatic diol, or mixtures thereof, containing from 2 to about 10 carbon atoms and at least one aromatic dicarboxylic acid. Preferred polyesters are derived from an aliphatic-diol and an dicarboxylic acid and have repeating units according to structural formula (VIII)

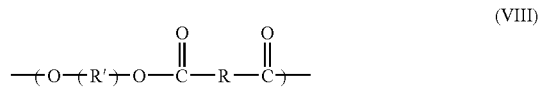

wherein, R' is an alkyl radical compromising a dehydroxylated residue derived from an aliphatic or cycloaliphatic diol, or mixtures thereof, containing from 2 to about 20 carbon atoms. R is an aryl radical comprising a decarboxylated residue derived from an aromatic dicarboxylic acid. In one embodiment of the present invention the polyester could be an aliphatic polyester where at least one of R' or R is a cycloalkyl containing radical. The polyester is a condensation product where R' is the residue of an aryl, alkane or cycloalkane containing diol having 6 to 20 carbon atoms or chemical equivalent thereof, and R is the decarboxylated residue derived from an aryl, aliphatic or cycloalkane containing diacid of 6 to 20 carbon atoms or chemical equivalent thereof. The polyester resins are typically obtained through the condensation or ester interchange polymerization of the diol or diol equivalent component with the diacid or diacid chemical equivalent component.

The diacids meant to include carboxylic acids having two carboxyl groups each useful in the preparation of the polyester resins of the present invention are preferably aliphatic, aromatic, cycloaliphatic. Examples of diacids are cyclo or bicyclo aliphatic acids, for example, decahydro naphthalene dicarboxylic acids, norbornene dicarboxylic acids, bicyclo octane dicarboxylic acids, 1,4-cyclohexanedicarboxylic acid or chemical equivalents, and most preferred is trans-1,4-cyclohexanedicarboxylic acid or a chemical equivalent. Linear dicarboxylic acids like adipic acid, azelaic acid, dicarboxyl dodecanoic acid, and succinic acid may also be useful. Chemical equivalents of these diacids include esters, alkyl esters, e.g., dialkyl esters, diaryl esters, anhydrides, salts, acid chlorides, acid bromides, and the like. Examples of aromatic dicarboxylic acids from which the decarboxylated residue R may be derived are acids that contain a single aromatic ring per molecule such as, e.g., isophthalic or terephthalic acid, 1,2-di(p-carboxyphenyl)ethane, 4,4'-dicarboxydiphenyl ether, 4,4'-bisbenzoic acid and mixtures thereof, as well as acids contain fused rings such as, e.g., 1,4- or 1,5-naphthalene dicarboxylic acids. In a preferred embodiment, the dicarboxylic acid precursor of residue R is terephthalic acid or, alternatively, a mixture of terephthalic and isophthalic acids.

Some of the diols useful in the preparation of the polyester resins of the present invention are straight chain, branched, or cycloaliphatic alkane diols and may contain from 2 to 12 carbon atoms. Examples of such diols include but are not limited to ethylene glycol; propylene glycol, i.e., 1,2- and 1,3-propylene glycol; 2,2-dimethyl-1,3-propane diol; 2-ethyl, 2-methyl, 1,3-propane diol; 1,3- and 1,5-pentane diol; dipropylene glycol; 2-methyl-1,5-pentane diol; 1,6-hexane diol; dimethanol decalin, dimethanol bicyclo octane;

1,4-cyclohexane dimethanol and particularly its cis- and trans-isomers; triethylene glycol; 1,10-decane diol; and mixtures of any of the foregoing. Preferably, a cycloaliphatic diol or chemical equivalent thereof and particularly 1,4-cyclohexane dimethanol or its chemical equivalents are used as the diol component. Chemical equivalents to the diols include esters, such as dialkylesters, diaryl esters, and the like.

Typically the polyester resin may comprise one or more resins selected from linear polyester resins, branched polyester resins and copolymeric polyester resins. Suitable linear polyester resins include, e.g., poly(alkylene phthalate)s such as, e.g, poly(ethylene terephthalate) ("PET"), poly(butylene terephthalate) ("PBT"), poly(propylene terephthalate) ("PPT"), poly(cycloalkylene phthalate)s such as, e.g., poly (cyclohexanedimethanol terephthalate) ("PCT"), poly(alkylene naphthalate)s such as, e.g., poly(butylene-2,6-naphthalate) ("PBN") and poly(ethylene-2,6-naphthalate) ("PEN"), poly(alkylene dicarboxylate)s such as, e.g., poly(butylene dicarboxylate).

In a preferred embodiment suitable copolymeric polyester resins include, e.g., polyesteramide copolymers, cyclohexanedimethanol-terephthalic acid-isophthalic acid copolymers and cyclohexanedimethanol-terephthalic acid-ethylene glycol ("PCTG") copolymers. The polyester component can, without limitation, comprise the reaction product of a glycol portion comprising 1,4-cyclohexanedimethanol and ethylene glycol, wherein the 1,4-cyclohexanedimethanol is greater than 50 mole percent based on the total moles of 1,4-cyclohexanedimethanol and ethylene glycol with an acid portion comprising terephthalic acid, or isophthalic acid or mixtures of both acids. The polyester component may be prepared by procedures well known to those skilled in this art, such as by condensation reactions. The condensation reaction may be facilitated by the use of a catalyst, with the choice of catalyst being determined by the nature of the reactants. The various catalysts for use herein are very well known in the art and are too numerous to mention individually herein. Generally, however, when an alkyl ester of the dicarboxylic acid compound is employed, an ester interchange type of catalyst is preferred, such as $Ti(OC_4H_9)_6$ in n-butanol.

In one embodiment copolyester in the subject invention is a copolyester as described above wherein the cyclohexanedimethanol portion has a predominance over ethylene glycol, preferably is about greater than 55 molar percent of cyclohexanedimethanol based on the total mole percent of ethylene glycol and 1,4-cyclohexanedimethanol, and the acid portion is terephthalic acid. In another embodiment of the present invention the polyester comprises structural units derived from terephthalic acid and a mixture of 1,4-cyclohexane dimethanol and ethylene glycol, wherein said cyclohexanedimethanol is greater than about 60 mole percent based on total moles of 1,4-cyclohexane dimethanol and ethylene glycol. In another embodiment, the polyester resin has an intrinsic viscosity of from about 0.4 to about 2.0 dl/g as measured in a 60:40 phenol/tetrachloroethane mixture at 23°-30° C.

In one embodiment the stabilized composition of the present invention may optionally comprise at least one epoxy-functional polymer. The epoxy polymer is an epoxy functional (alkyl)acrylic monomer and at least one non-functional styrenic and/or (alkyl)acrylic monomer. In one embodiment of the present invention the epoxy polymer has at least one epoxy-functional (meth)acrylic monomer and at least one non-functional styrenic and/or (meth)acrylic monomer. These quenchers are characterized by relatively low molecular weights. In another embodiment the quenchers are epoxy-functional styrene (meth)acrylic copolymers produced from monomers of at least one epoxy functional (meth)acrylic monomer and at least one non-functional styrenic and/or (meth)acrylic monomer. As used herein, the term (meth) acrylic includes both acrylic and methacrylic monomers. Non limiting examples of epoxy-functional (meth)acrylic monomers include both acrylates and methacrylates. Examples of these monomers include, but are not limited to, those containing 1,2-epoxy groups such as glycidyl acrylate and glycidyl methacrylate. Other suitable epoxy-functional monomers include allyl glycidyl emer, glycidyl ethacrylate, and glycidyl itoconate.

Suitable acrylate and methacrylate monomers include, but are not limited to, methyl acrylate, ethyl acrylate, n-propyl acrylate, i-propyl acrylate, n-butyl acrylate, s-butyl acrylate, i-butyl acrylate, t-butyl acrylate, n-amyl acrylate, i-amyl acrylate, isobornyl acrylate, n-hexyl acrylate, 2-ethylbutyl acrylate, 2-ethylhexyl acrylate, n-octyl acrylate, n-decyl acrylate, methylcyclohexyl acrylate, cyclopentyl acrylate, cyclohexyl acrylate, methyl methacrylate, ethyl methacrylate, n-propyl methacrylate, n-butyl methacrylate, i-propyl methacrylate, i-butyl methacrylate, n-amyl methacrylate, n-hexyl methacrylate, i-amyl methacrylate, s-butyl-methacrylate, t-butyl methacrylate, 2-ethylbutyl methacrylate, methylcyclohexyl methacrylate, cinnamyl methacrylate, crotyl methacrylate, cyclohexyl methacrylate, cyclopentyl methacrylate, 2-ethoxyethyl methacrylate, and isobornyl methacrylate. Non-functional acrylate and non-functional methacryl ate monomers include butyl acrylate, butyl methacryl ate, methyl methacrylate, iso-butyl methacrylate, cyclohexyl acrylate, cyclohexyl methacrylate, 15 isobomyl acrylate and isobornyl methacrylate and combinations thereof are particularly suitable. Styrenic monomers for use in the present invention include, but are not limited to, styrene, alpha-methyl styrene, vinyl toluene, p-methyl styrene, t-butyl styrene, o-chlorostyrene, vinyl pyridine, and mixtures of these species. In certain embodiments the styrenic monomers for use in the present invention are 20 styrene and alpha-methyl styrene. In one embodiment of the present invention the epoxy functional polymer may also be used as a quencher.

In one embodiment the claimed invention a catalyst may optionally be employed. If used, the catalyst can be any of the catalysts commonly used in the prior art such as alkaline earth metal oxides such as magnesium oxides, calcium oxide, barium oxide and zinc oxide; alkali and alkaline earth metal salts; a Lewis catalyst such as tin or tinanium compounds; a nitrogen-containing compound such as tetra-alkyl ammonium hydroxides used like the phosphonium analogues, e.g., tetra-alkyl phosphonium hydroxides or acetates. The Lewis acid catalysts and the catalysts can be used simultaneously.

Inorganic compounds such as the hydroxides, hydrides, amides, carbonates, phosphates, borates, etc., of alkali metals such as sodium, potassium, lithium, cesium, etc., and of alkali earth metals such as calcium, magnesium, barium, etc., can be cited such as examples of alkali or alkaline earth metal compounds. Examples include sodium stearate, sodium carbonate, sodium acetate, sodium bicarbonate, sodium benzoate, sodium caproate, or potassium oleate.

In one embodiment of the invention, the catalyst is selected from one of phosphonium salts or ammonium salts (not being based on any metal ion) for improved hydrolytic stability properties. In another embodiment of the invention, the catalyst is selected from one of: a sodium stearate, a sodium benzoate, a sodium acetate, and a tetrabutyl phosphonium acetate. In yet another embodiment of the present invention the catalysts is selected independently from a group of sodium stearate, zinc stearate, calcium stearate, magnesium stearate, sodium acetate, calcium acetate, zinc acetate, magnesium acetate, manganese acetate, lanthanum acetate, lanthanum acetylacetonate, sodium benzoate, sodium tetraphenyl borate, dibutyl tinoxide, antimony trioxide, sodium polystyrenesulfonate, PBT-ionomer, titanium isoproxide and tetraammoniumhydrogensulfate and mixtures thereof.

In one embodiment of the present invention the thermoplastic composition comprises a mixture of stabilizers. In one embodiment of the present invention the thermoplastic resin composition comprises stabilizing additives. In another embodiment the stabilizing additives is a quenchers are used in the present invention to stop the polymerization reaction between the polymers. Quenchers are agents inhibit activity of any catalysts that may be present in the resins to prevent an accelerated interpolymerization and degradation of the thermoplastic. The suitability of a particular compound for use as a stabilizer and the determination of how much is to be used as a stabilizer may be readily determined by preparing a mixture of the polyester resin component and the polycarbonate and determining the effect on melt viscosity, gas generation or color stability or the formation of interpolymer. In one embodiment of the present invention the thermoplastic composition comprises at least two quenchers wherein the said quenchers are selected from a group consisting of phosphorous containing compounds, boric containing acids, aliphatic or aromatic carboxylic acids i.e., organic compounds the molecule of which comprises at least one carboxy group, anhydrides, polyols, and epoxy polymer.

The choice of the quencher is essential to avoid color formation and loss of clarity of the thermoplastic composition. In one embodiment of the invention, the catalyst quenchers are phosphorus containing derivatives, such as organic phosphites as well as phosphorous acid. Examples include but are not limited to diphosphites, phosphonates, metaphosphoric acid; arylphosphinic and arylphosphonic acids.

It should be noted that some quenchers, as in the class of phosphites, also provide the thermoplastic resin additional desirable properties, e.g., fire resistance. The favored stabilizers include an effective amount of an acidic phosphate salt; an acid, alkyl, aryl or mixed phosphite having at least one acidic hydrogen; a Group IB or Group IIB metal phosphate salt; a phosphorus oxo acid, a metal acid pyrophosphate or a mixture thereof. The acidic phosphate salts include sodium dihydrogen phosphate, mono zinc phosphate, potassium hydrogen phosphate, calcium dihydrogen phosphate and the like. The phosphites may be of the formula IX:

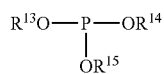

(IX)

where $R^{13}$, $R^{14}$ and $R^{15}$ are independently selected from the group consisting of hydrogen, alkyl and aryl with the proviso that at least one of $R^{13}$ $R^{14}$ and $R^{15}$ is hydrogen. The phosphate salts of a Group IB or Group IIB metal include zinc phosphate and the like. The phosphorus oxo acids include phosphorous acid, phosphoric acid, polyphosphoric acid or hypophosphorous acid.

The polyacid pyrophosphates may be of the formula X:

$$M_{zx}H_yP_nO_{3n+1} \quad\quad\quad (X)$$

wherein M is a metal, x is a number ranging from 1 to 12 and y is a number ranging 1 to 12, n is a number from 2 to 10, z is a number from 1 to 5 and the sum of (zx)+y is equal to n+2. The preferred M is an alkaline or alkaline earth metal. The most preferred quenchers are oxo acids of phosphorus or acidic organo phosphorus compounds.

In one embodiment of the present invention the quenchers are polyols that are admixed with the poly-carbonate and polyester. They may be represented by the formula XI.

$$R^{16}\text{---}(OH)_r \quad\quad\quad (XI)$$

wherein, $R^{16}$ is a substituted or unsubstituted aliphatic moiety, a substituted or unsubstituted aliphatic--aromatic moiety, preferably containing from 2 to about 20 carbon atoms and r is a positive integer having a value of from 2 up to the number of replaceable hydrogen atoms present on $R^{16}$, preferably having a value of from 2 to about 12. In one embodiment of the present invention with the proviso that when $R^{16}$ is a substituted or unsubstituted aliphatic-aromatic moiety the hydroxyl groups are bonded to the aliphatic portion of said moiety.

In one embodiment of the invention the $R^{16}$ is a substituted or unsubstituted aliphatic moieties include but not restricted to the acylic aliphatics and the cyclo-aliphatics. The acylic aliphatic moieties are preferably those containing from 2 to about 20 carbon atoms in either a straight chain or branched chain. In one embodiment of the present invention the cyclic aliphatic moieties are preferably those containing from 4 to about 8 ring carbon atoms. In another embodiment of the invention the cyclic aliphatic moieties may contain alkyl substituent groups on the ring carbon atoms, and the hydroxyl groups may be bonded to either the ring carbon atoms or to the alkyl substituent groups, or to both. In yet another embodiment $R^{16}$ is a substituted or unsubstituted aliphatic-aromatic moieties containing an aromatic portion which preferably contains from 6 to 12 ring carbon atoms, which include but not limited to phenyl, naphthyl, and biphenyl, and an aliphatic portion bonded to the ring carbon atoms of the aromatic portion, with the hydroxyl groups being present only the aliphatic portion.

In one embodiment the polyols of formula XI are the acylic aliphatic polyhydric alkanols, with the hexahydric alkanols being preferred. Preferred polyols of this type are those wherein the hydroxyl groups are bonded to different carbon atoms of the acylic aliphatic moiety. Some illustrative non-limiting examples of polyols represented by formula XI include cyclo-hexane dimethanol, butanediol, mannitol, sorbitol, 1,3-propanediol, glycerol, 1,2-cyclopentanediol, inositol, 1,3,5-cylcohexanetriol, 1,2,3,4,5-penta-hydrocypentane, and 1,1,2,2-tetrahydroxyethane.

According to the present invention, the quencher may be a carboxylic acid derivative having the above formula XII.

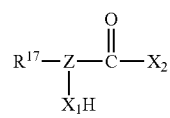

(XII)

wherein $X_1$ may be either zero or NH, $X_2$ may be either $OR^{18}$ or $NHR^{18}$ and is always the former when $X_1$ is NH. The $R^{18}$ may be hydrogen, alkyl, aryl, radicals having up to 10 carbon atoms. In one embodiment Z may be CH or a substituted or unsubstituted aromatic carbocyclic radical. The substituents on the ring do not materially affect the character of the substituted carboxylic acid derivative for the purposes of this invention. The $R^{17}$ is either hydrogen or a hydrocarbon-based radical including but not limited to both hydrocarbon and substituted hydrocarbon radicals, provided the substituents satisfy the above criterion. Most often, $R^{17}$ is hydrogen, alkyl, or aryl radical that may contain substituents such as hydroxy, carboxy and carbalkoxy. In one embodiment the carbalkoxy radical is $COOR^{18}$.

In one embodiment of the present invention the substituted carboxylic acid derivatives used according to this invention may be but not limited to alpha.-hydroxy or alpha-amino aliphatic acid derivatives or o-hydroxy or o-amino aromatic acid derivatives. Illustrative compounds of this type are alkyl salicylate like for example, methyl salicylate, ethyl salicylate, aryl salicylate, salicylamide, glycine, malic acid, mandelic acid and dibutyl tartrate.

The amount of the quencher added to the thermoplastic composition is an amount that is effective to stabilize the thermoplastic composition. In one embodiment the amount is at least about 0.001 weight percent, preferably at least about 0.01 weight percent based on the total amounts of said thermoplastic resin compositions. In another embodiment the amount of quencher mixture present should not exceed about 0.1 weight percent, preferably it should not exceed about 0.05 weight percent. In another embodiment the amount of quencher is in a range between about 25 and about 2000 parts per million percent based on the total amounts of the said thermoplastic composition. In yet another embodiment the amount of quencher is in a range between about 50 and about 1500 parts per million percent based on the total amounts of the said thermoplastic composition.

In general, if less than about 0.01 weight percent of quencher mixture is present there is no appreciable stabilization of the thermoplastic composition. If a large amount of the quencher is used than some of the advantageous properties of the thermoplastic composition may be adversely affected. The amount of quencher used is thus an amount which is effective to stabilize the composition therein but insufficient to substantially deleteriously affect substantially most of the advantageous properties of said composition.

The composition of the present invention may optionally include additional components which do not interfere with the previously mentioned desirable properties but enhance other favorable properties such as anti-oxidants, flame retardants, reinforcing materials, colorants, mold release agents, fillers, nucleating agents, UV light and heat stabilizers, lubricants, and the like. Additionally, additives such as antioxidants, minerals such as talc, clay, mica, barite, wollastonite and other stabilizers including but not limited to UV stabilizers, such as benzotriazole, supplemental reinforcing fillers such as flaked or milled glass, and the like, flame retardants, pigments or combinations thereof may be added to the compositions of the present invention.

Flame-retardant additives are desirably present in an amount at least sufficient to reduce the flammability of the polyester resin, preferably to a UL94 V-0 rating. The amount will vary with the nature of the resin and with the efficiency of the additive. In general, however, the amount of additive will be from 2 to 30 percent by weight based on the weight of resin. A preferred range will be from about 15 to 20 percent.

Typically halogenated aromatic flame-retardants include tetrabromobisphenol A polycarbonate oligomer, polybromophenyl ether, brominated polystyrene, brominated BPA polyepoxide, brominated imides, brominated polycarbonate, poly (haloaryl acrylate), poly (haloaryl methacrylate), or mixtures thereof. Examples of other suitable flame retardants are brominated polystyrenes such as polydibromostyrene and polytribromostyrene, decabromobiphenyl ethane, tetrabromobiphenyl, brominated alpha, omega-alkylene-bis-phthalimides, e.g. N,N'-ethylene-bis-tetrabromophthalimide, oligomeric brominated carbonates, especially carbonates derived from tetrabromobisphenol A, which, if desired, are end-capped with phenoxy radicals, or with brominated phenoxy radicals, or with brominated epoxy resins.

The flame retardants are typically used with a synergist, particularly inorganic antimony compounds. Such compounds are widely available or can be made in known ways. Typical, inorganic synergist compounds include $Sb_2O_5$, $SbS_3$, sodium antimonate and the like. Especially preferred is antimony trioxide ($Sb_2O_3$). Synergists such as antimony oxides, are typically used at about 0.5 to 15 by weight based on the weight percent of resin in the final composition. Also, the final composition may contain polytetrafluoroethylene (PTFE) type resins or copolymers used to reduce dripping in flame retardant thermoplastics.

Other additional ingredients may include antioxidants, and UV absorbers, and other stabilizers. Antioxidants include i) alkylated monophenols, for example: 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(alpha-methylcyclohexyl)-4,6 dimethylphenol, 2,6-di-octadecyl-4-methylphenol, 2,4,6,-tricyclohexyphenol, 2,6-di-tert-butyl-4-methoxymethylphenol; ii) alkylated hydroquinones, for example, 2,6-di-tert-butyl-4-methoxyphenol, 2,5-di-tert-butyl-hydroquinone, 2,5-di-tert-amyl-hydroquinone, 2,6-diphenyl-4octadecyloxyphenol; iii) hydroxylated thiodiphenyl ethers; iv) alkylidene-bisphenols; v) benzyl compounds, for example, 1,3,5-tris-(3,5-di-tert-butyl-4-hydroxybenzyl)-2,4,6-trimethylbenzene; vi) acylaminophenols, for example, 4-hydroxy-lauric acid anilide; vii) esters of beta-(3,5-di-tert-butyl-4-hydroxyphenol)-propionic acid with monohydric or polyhydric alcohols; viii) esters of beta-(5-tert-butyl-4-hydroxy-3-methylphenyl)-propionic acid with monohydric or polyhydric alcohols; vii) esters of beta-(5-tert-butyl-4-hydroxy-3-methylphenyl) propionic acid with mono-or polyhydric alcohols, e.g., with methanol, diethylene glycol, octadecanol, triethylene glycol, 1,6-hexanediol, pentaerythritol, neopentyl glycol, tris(hydroxyethyl) isocyanurate, thiodiethylene glycol, N,N-bis(hydroxyethyl) oxalic acid diamide. Typical, UV absorbers and light stabilizers include i) 2-(2'-hydroxyphenyl)-benzotriazoles, for example, the 5'methyl-,3'5'-di-tert-butyl-,5'-tert-butyl-,5'(1,1,3,3-tetramethylbutyl)-, 5-chloro-3'5'-di-tert-butyl-,5-chloro-3'tert-butyl-5'methyl-,3'sec-butyl-5'tert-butyl-,4'-octoxy,3',5'-ditert-amyl-3'5'-bis-(alpha, alpha-dimethylbenzyl)-detivatives; ii) 2.2 2-Hydroxy-benzophenones, for example, the 4-hydroxy-4-methoxy-,4-octoxy,4-decloxy-,4-dodecyloxy-,4-benzyloxy,4,2',4'-trihydroxy-and 2 hydroxy-4,4'-dimethoxy derivative, and iii) esters of substituted and unsubstituted benzoic acids for example, phenyl salicylate, 4-tert-butylphenyl-salicilate, octylphenyl salicylate, dibenzoylresorcinol, bis-(4-tert-butylbenzoyl)-resorcinol, benzoylresorcinol, 2,4-di-tert-butyl-phenyl-3,5-di-tert-butyl-4-hydroxybenzoate and hexadecyl-3,5-di-tert-butyl-4-hydroxybenzoate. Phosphites and phosphonites stabilizers, for example, include triphenyl phosphite, diphenylalkyl phosphites, phenyldialkyl phosphites, tris(nonyl-phenyl) phosphite, trilauryl phosphite, trioctadecyl phosphite, distearyl pentaerythritol diphosphite, tris(2,4-di-tert-butylphenyl)phosphite, diisodecyl pentaerythritol diphosphite, bis(2,4-di-tert-butylphenyl)pentaerythritol diphosphite tristearyl sorbitol triphosphite, and tetrakis(2,4-di-tert-butylphenyl)4,4'-biphenylene diphosphonite.

Dyes or pigments may be used to give a background coloration. Dyes are typically organic materials that are soluble in the resin matrix while pigments may be organic complexes or even inorganic compounds or complexes which are typically insoluble in the resin matrix. These organic dyes and pigments include the following classes and examples: furnace carbon black, titanium oxide, phthalocyanine blues or greens, anthraquinone dyes, scarlet 3b Lake, azo compounds and acid azo pigments, quinacridones, chromophthalocyanine pyrrols, halogenated phthalocyanines, quinolines, heterocyclic dyes, perinone dyes, anthracenedione dyes, thioxanthene dyes, parazolone dyes, polymethine pigments and others.

The range of composition of the thermoplastic resin of the present invention is from about 10 to 90 weight percent of the polycarbonate component, 90 to about 10 percent by weight of the polyester component. In one embodiment, the composition comprises about 25-75 weight percent polycarbonate and 75-25 weight percent of the polyester component.

PROCESSING The method of blending the compositions can be carried out by conventional techniques. One convenient method comprises blending the polyester or polycarbonate and other ingredients in powder or granular form, extruding the blend and comminuting into pellets or other suitable shapes. The ingredients are combined in any usual manner, e.g., by dry mixing or by mixing in the melted state in an extruder, on a heated mill or in other mixers. Colorants may be added to the extruder downstream of the feed port. The thermoplastic resin of this invention can be processed by various techniques including but not limited to injection molding, blow molding, extrusion into sheet, film or profiles, compression molding.

In one embodiment the blend of the present invention, polycarbonate, polyester, and optional additives thereof, is polymerized by extrusion at a temperature ranging from about 225 to 350° C. for a sufficient amount of time to produce a copolymer characterized by a single Tg. In the present invention, either a single or twin screw extruder can be used. The extruder should be one having multiple feeding points, allowing the catalyst quencher to be added at a location down-stream in the extruder.

In one embodiment the process is a one pass process wherein all the components were mixed together and added in the feeder. In another embodiment the process is a one pass process wherein the catalyst is added at the beginning of the extrusion process via an upstream feeding point, and the quencher is added at the later portion of the extruder process via a downstream feeding point. Since the quencher is added downstream after the completion of the reaction, it has little or no impact on the haze of the composition.

In one embodiment the catalyst is added at the beginning of the extrusion process via an upstream feeding point. The colored clear thermoplastic resin are then reloaded into the extruder and the quencher is added to the blend in the second pass via a downstream feeding point. Since the catalyst quencher is added downstream after the completion of the reaction, it has little or no impact on the haze of the composition. The residence time can be up to about 45 to 90 seconds.

The rate at which polycarbonate, polyester and optional additives are delivered into the extruder for melt mixing depends on the design of the screws of the extruder. Characteristic residence times for the single-pass and double-pass extrusion process of the invention varies according to extrusion operating parameters, the screw design.

The molten mixture of the optically clear thermoplastic resin composition so formed to particulate form, example by pelletizing or grinding the composition. The composition of the present invention can be molded into useful articles by a variety of means by many different processes to provide useful molded products such as injection, extrusion, rotation, foam molding calender molding and blow molding and thermoforming, compaction, melt spinning form articles. The thermoplastic composition of the present invention has additional properties of good mechanical properties, color stability, oxidation resistance, good flame retardancy, good processability, i.e. short molding cycle times, good flow, and good insulation properties. The articles made from the composition of the present invention may be used widely in house ware objects such as food containers and bowls, home appliances, as well as films, electrical connectors, electrical devices, computers, building and construction, outdoor equipment, trucks and automobiles.

EXAMPLES

Without further elaboration, it is believed that one skilled in the art can, using the description herein, utilize the present invention to its fullest extent. The following examples are included to provide additional guidance to those skilled in the art in practicing the claimed invention. The examples provided are merely representative of the work that contributes to the teaching of the present application. While only certain features of the invention have been illustrated and described herein, many modifications and changes will occur to those skilled in the art. Accordingly, these examples are not intended to limit the invention, as defined in the appended claims, in any manner.

In the following examples values for glass transition temperatures (Tg) were determined by differential scanning calorimetry (DSC) at a heating rate of 20° C. per minute. Weight average molecular weights were measured by gel permeation chromatography (GPC) versus polystyrene standards using chloroform as solvent. The GPC column was a Mixed-C column with dimensions 300 millimeters (mm)× 7.5 mm available from Polymer Laboratories. Yellow index or YI was measured on a Gardner Colorimeter model XL-835. The percentage transmission and haze were determined in accordance with test method ASTM D-1003. Melt volume rate was measured as per ISO Standard 1133, 265° C., 240 seconds, 2.16 Kg, and 0.0825 inch orifice. The heat distortion temperature (also known as HDT) test were performed by placing HDT samples edgewise, at load of 1.8 MPa and heating rate of 120C./hr (degree celsius/hr). Environmental stress cracking resistance was measured making tensile bars of the samples and they were subjected to a constant strain, these were then kept in an oven at 60° C. and the defects on the surface like cracks, crazes were checked. Flexural properties were measured using ISO 178 method. Flexural modulus was measured by ASTM D970 method at room temperature. Chemical resistance was measured on an extruded test piece (thickness=2.5 mm) was secured in 1% distortion jig and exposed various solvents for two days and the elongation at break was measured. The tensile properties were determined using ISO 527 and the Izod Impact were measured using the standard ISO 180/U method.

Examples 1-11

In these example, 70 weight percent of polycarbonate available from General Electric Company as Lexan® polycarbonate resin was blended with a PCTG polyester from Eastman Chemicals (30 weight percent) and varying levels of a mixture of quenchers. The blends were compounded at 270° C. on a WP25 mm co-rotating twin screw extruder, yielding a pelletized composition. Compounding was carried out at a feed rate of about 15 kilo gram per hour and a screw speed of about 300 rotations per minute. Blends of polycarbonate and polyesters with quencher combinations have been prepared. The resulting pellets were dried for at least four hours at 100° C. before injection molding into ASTM/ISO test specimens on an 80 ton, four oz. injection molding machine operated at a temperature of about 280° C. Samples molded from the blends were tested for optical properties like % Transmission, % haze and yellow index. MVR is measure for all the blends and those samples were exposed to heat and humidity (80° C. and 80% RH) and MVR is measured after about seven days to measure the degradation in the blend which will in turn relate to hydrostability of the material. The results are indicated in Table 1.

TABLE 1

PC/PCTG thermoplastic compositions with varying combinations of quenchers.

|  | Quencher 1 (ppm) | Quencher 2 (ppm) | Quencher 3 (ppm) | YI | MVR-Initial | MVR-1 Wk | % Change | % T | % H |
|---|---|---|---|---|---|---|---|---|---|
| Ex. 1 | $H_3PO_4$ (50) | Malic Acid (50) | — | 2.99 | 9.5 | 11.5 | 21.05 | 90 | 3.57 |
| Ex. 2 | $H_3PO_4$ (50) | Methyl Salicylate (50) | — | 3.19 | 9.1 | 10.7 | 17.58 | 89.9 | 2.43 |
| Ex. 3 | $H_3PO_4$ (33) | Methyl Salicylate (50) | — | 3.17 | 9 | 9.8 | 8.89 | 89.9 | 3.64 |
| Ex. 4 | $H_3PO_4$ (17) | Methyl Salicylate (33) | Boric acid (50) | 3.1 | 8.35 | 9.67 | 15.81 | 91 | 1.17 |
| Ex. 5 | $H_3PO_4$ (50) | — | Boric acid (50) | 2.1 | 8.65 | 10.7 | 23.70 | 91 | 1.04 |
| Ex. 6 | — | Methyl Salicylate (50) | Boric acid (50) | 4.6 | 8.3 | 9.3 | 12.05 | 90.7 | 0.96 |
| Ex. 7 | $H_3PO_4$ (25) | — | Boric acid (75) | 3.1 | 8.55 | 9.55 | 11.70 | 91 | 0.95 |
| Ex. 8 | $H_3PO_4$ (25) | Methyl Salicylate (50) | Boric acid- (25) | 2.8 | 8.7 | 9.65 | 10.92 | 91 | 1.78 |
| Ex. 9 | $H_3PO_4$ (50) | Phenyl Phosphonic acid (50) | — | 2.9 | — | — | — | 91 | 0.74 |
| Ex. 10 | $H_3PO_4$ (50) | Mannitol (100) | — | 2.02 | — | — | — | 91 | 0.93 |
| Ex. 11 | $H_3PO_4$ (50) | Mannitol (150) | — | 2.04 | — | — | — | 91 | 0.95 |

Comparative Examples CEx.1-CEx.9

In these example, 70 weight percent of polycarbonate available from General Electric Company as Lexan® polycarbonate resin was blended with a PCTG polyester from Eastman Chemicals (30 weight percent) and varying levels of single quenchers. The blends were compounded at 270° C. on a WP25 mm co-rotating twin screw extruder, yielding a pelletized composition. Compounding was carried out at a feed rate of about 15 kilo gram per hour and a screw speed of about 300 rotations per minute. The resulting pellets were dried for at least four hours at 100° C. before injection molding into ASTM/ISO test specimens on an 80 ton, four oz. injection molding machine operated at a temperature of about 280° C. Samples molded from the blends were tested for optical properties like % Transmission, % haze and yellow index. MVR is measure for all the blends and those samples were exposed to heat and humidity (80° C. and 80% RH) and MVR is measured after about seven days to measure the degradation in the blend which will in turn related to hydrostability of the material. The results are indicated in Table 2.

TABLE 2

| | Quencher (ppm) | YI | MVR-Initial | MVR-1 Wk | % Change after 1 Wk | % T | % H |
|---|---|---|---|---|---|---|---|
| CEx. 1 | Ph Acid (75) | 2.3 | 11.85 | 14.9 | 25.74 | 88.55 | 2.05 |
| CEx. 2 | Malic Acid (250) | 5.35 | 9.1 | 10.1 | 10.99 | 88.7 | 3.35 |
| CEx. 3 | Methyl Salicylate (100) | 8.3 | 8.7 | 9.6 | 10.34 | 88.4 | 2.93 |
| CEx. 4 | Zinc Phosphate (500) | 9.78 | 8.9 | 9.6 | 7.87 | 87.2 | 8.9 |
| CEx. 5 | Boric Acid (100) | 4.6 | 8.55 | 9.25 | 8.19 | 90 | 1.2 |
| CEx. 6 | Sodium di-hydrogen ortho phosphate (500) | 5.52 | 8.7 | 9.5 | 9.20 | 86.87 | 12.47 |
| CEx. 7 | Mannitol (200) | 2.3 | 9.85 | 10.75 | 9.14 | 89.05 | 1.61 |
| CEx. 8 | D-Sorbitol (200) | 1.58 | 9.5 | 10.25 | 7.89 | 89.3 | 2.47 |
| CEx. 9 | Phenyl Phosphonic acid (100) | 3 | 8.9 | 10.1 | 13.48 | 88.9 | 0.95 |

Chemical resistance of the polycarbonate-PCTG blends is measured with respect to the elongation at break values for the samples after exposure to chemicals for two days. The percentage of the quenchers present in the composition is indicated. The data is given in Table 3.

TABLE 3

| | | Retention of Elongation at Break after two days of exposure (%) | | |
|---|---|---|---|---|
| Chemical | | 75 ppm $H_3PO_4$ | 1% Epoxy polymer | 2% Epoxy polymer |
| Oleic acid | No exposure | 100 | 100 | 100 |
| | No strain | 71 | 87 | 90 |
| | 1% strain | 4 | 15 | 17 |
| Coppertone | No strain | 79 | 96 | 5 |
| | 1% strain | 47 | 2 | 2 |
| Windex | No strain | 83 | 78 | 86 |
| | 1% strain | 5 | 4 | 4 |
| Cascade | No strain | 89 | 96 | 96 |
| | 1% strain | Breaks | 93 | 94 |
| Vegetable oil | No strain | 81 | 92 | 86 |
| | 1% strain | 104 | 50 | 88 |

These data shows that thermoplastic compositions of the invention with a mixture of quenchers have beneficial properties and a balance of optical property, processability, solvent resistance and hydrostability in addition to good mechanical and thermal properties.

While the invention has been illustrated and described in typical embodiments, it is not intended to be limited to the details shown, since various modifications and substitutions can be made without departing in any way from the spirit of the present invention. As such, further modifications and equivalents of the invention herein disclosed may occur to persons skilled in the art using no more than routine experimentation, and all such modifications and equivalents are believed to be within the spirit and scope of the invention as defined by the following claims. All Patents and published articles cited herein are incorporated herein by reference.

The invention claimed is:

1. A stabilized thermoplastic resin composition comprising: a substituted or unsubstituted polycarbonate, a substituted or unsubstituted polyester and a combination of first and second quenchers, wherein the first and second quenchers are present in an amount of from 0.01 to 0.05 percent by weight, and wherein the first quencher is an epoxy-functional styrenic (meth)acrylic copolymer, and the second quencher is selected from the group consisting of phosphorus compounds, carboxylic acid derivative compounds, polyols, and boron compounds.

2. The composition of claim 1, wherein said polycarbonate comprises repeating units of the formula:

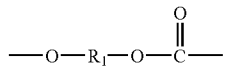

wherein $R_1$ is a divalent aromatic radical derived from a dihydroxyaromatic compound of the formula HO-D-OH, wherein D has the structure of formula:

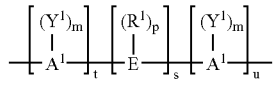

wherein $A^1$ represents an aromatic group; E comprises a sulfur-containing linkage, sulfide, sulfoxide, sulfone; a phosphorus-containing linkage, phosphinyl, phosphonyl; an ether linkage; a carbonyl group; a tertiary nitrogen group; a silicon-containing linkage; silane; siloxy; a cycloaliphatic group; cyclopentylidene, cyclohexylidene, 3,3,5-trimethyl-cyclohexylidene, methylcyclohexylidene, 2-[2.2.1]-bicyclo-heptylidene, neopentylidene, cyclopentadecylidene, cyclododecylidene, adamantylidene; an alkylene or alkylidene group, which group may optionally be part of one or more fused rings attached to one or more aromatic groups bearing one hydroxy substituent; an unsaturated alkylidene group; or two or more alkylene or alkylidene groups connected by a moiety different from alkylene or alkylidene and selected from the group consisting of an aromatic linkage, a tertiary nitrogen linkage; an ether linkage; a carbonyl linkage; a silicon-containing linkage, silane, siloxy; a sulfur-containing linkage, sulfide, sulfoxide, sulfone; a phosphorus-containing linkage, phosphinyl, and phosphonyl; $R^1$ independently at each occurrence comprises a mono-valent hydrocarbon group, alkenyl, allyl, alkyl, aryl, aralkyl, alkaryl, or cycloalkyl; $Y^1$ independently at each occurrence is selected from the group consisting of an inorganic atom, a halogen; an inorganic group, a nitro group; an organic group, a monovalent hydrocarbon group, alkenyl, allyl, alkyl, aryl, aralkyl, alkaryl, cycloalkyl, and an alkoxy group; the letter "m" represents any integer from and including zero through the number of replaceable hydrogens on $A^1$ available for substitution; the letter "p" represents an integer from and including zero through the number of replaceable hydrogens on E available for substitution; the letter "t" represents an integer equal to at least one; the letter "s" represents an integer equal to either zero or one; and "u" represents any integer including zero.

3. The composition of claim 2, wherein the dihydroxyaromatic compound from which D is derived is bisphenol A.

4. The composition of claim 1, wherein the polyester is derived from structural units comprising at least one substituted or unsubstituted aliphatic diols, or substituted or unsubstituted cycloaliphatic diol and at least one substituted or unsubstituted aromatic dicarboxylic acid or substituted or unsubstituted aliphatic dicarboxylic acid.

5. The composition of claim 1, wherein said polyester is selected from the group consisting of poly(alkylene phthalate)s, poly(cycloalkylene phthalate)s, poly(alkylene dicarboxylate)s, polyesteramide copolymers, and copolyesters derived from structural units comprising at least one alkyl diol or cycloaliphatic diol and at least one aromatic acids, aliphatic acid or cycloaliphatic acid.

6. The composition of claim 1, wherein said polyester is selected from a group consisting of poly(ethylene terephthalate), poly(butylene terephthalate), poly(propylene terephthalate), poly(cyclohexanedimethanol terephthalate), poly(cyclohexanedimethanol-ter-ephthalic acid-ethylene glycol), poly(butylene-2,6-napthalate), poly(ethylene-2,6-naphthalate), poly(butylene dicarboxylate) and combinations thereof.

7. The composition of claim 1, wherein said thermoplastic resin composition comprises structural units derived from polyester and polycarbonate in a range of about 90 to 10 percent by weight of polyester and 10 to 90 percent by weight of polycarbonate.

8. The composition of claim 1, wherein said thermoplastic resin composition comprises structural units derived from polyester and polycarbonate in a range of about 75 to 25 percent by weight of polyester and 25 to 75 percent by weight of polycarbonate.

9. The composition of claim 1, wherein the second quencher comprises a phosphorus compound selected from the group consisting of oxo acids, organo phosphates, acid phosphate metal salts, acid organo phosphites, diphosphites, esters of phosphoric acid, salts of phosphoric acids arylphosphonic acid, metal salts of phosphites.

10. The composition of claim 9, wherein said phosphorus compound is selected from the group consisting of phosphorus oxo acids, esters of phosphoric acid, salts of phosphoric acids and arylphosphonic acid.

11. The composition of claim 1, wherein the second quencher comprises boric acid.

12. The composition of claim 1, wherein the second quencher comprises a polyol of the formula $$R^{16}-(OH)_r$$

wherein, $R^{16}$ is selected from the group consisting of substituted or unsubstituted aliphatic moiety, a substituted or unsubstituted aliphatic-aromatic moiety having from 2 to 20 carbon atoms and r is a positive integer having a value of from 2 up to the number of replaceable hydrogen atoms present on $R^{16}$.

13. The composition of claim 12, wherein said polyol is an acyclic aliphatic polyhydric alkanol.

14. The composition of claim 12, wherein said polyol is hexahydric alcohol.

15. The composition of claim 12, wherein said polyol is selected from the group consisting of mannitol, butanediol, cyclohexane dimethanol, 1,3-propanediol glycerol, 1,2-pentanediol, 1,3,5-cyclohexanetriol, sorbitol, inositol and combinations thereof.

16. The composition of claim 1, wherein the second quencher is a carboxylic acid derivative of the formula $$R^{17}-Z-\underset{\underset{X_1H}{|}}{\overset{\overset{O}{\|}}{C}}-X_2$$

wherein $X_1$ is nothing or NH; $X_2$ is $OR^{18}$ when $X_1$ is NH and $X_2$ is $OR^{18}$ or $NHR^{18}$ when $X_1$ is nothing; Z is CH or a substituted or unsubstituted aromatic carbocyclic radical; $R^{17}$ is hydrogen or a substituted or unsubstituted hydrocarbon-based radical; $R^{18}$ is selected from the group consisting of hydrogen, and alkyl and aryl radicals having up to 10 carbon atoms or an ester thereof.

17. The composition of claim 16, wherein said second quencher is selected from a group consisting of alkyl salicylate, aryl salicylate, salicylamide, glycine, malic acid, mandelic acid, dibutyl tartrate and combinations thereof.

18. The composition of claim 1, wherein said epoxy-functional stryrene (meth)acrylic copolymer comprises
(1) at least one epoxy-functional alkyl acrylic monomer and
(ii) at least one functional or non-functional styrenic monomer.

19. The composition of claim 18, wherein said epoxy-functional styrene (meth)acrylic copolymer comprises at least one epoxy functional (meth)acrylic monomer and at least one non-functional styrenic monomer.

20. The composition of claim 1, wherein said thermoplastic resin composition has a yellowness index of less than about 10.

21. The composition of claim 1, wherein said resin composition transmits greater than 85 percent light in the region of about 250 nm to about 300 nm.

22. The composition of claim 1, wherein said resin composition has a haze value of less than 15.

23. The composition of claim 1, wherein said composition further comprises one or more additional components, said additional components selected from the group consisting of anti-oxidants, flame retardants, reinforcing materials, colorants, mold release agents, fillers, nucleating agents, UV light stabilizers, heat stabilizers, lubricants, and combinations thereof.

24. An article comprising the composition of claim 1.

25. The composition of claim 1, wherein the second quencher is $H_3PO_3$ or $ZnHPO_4$.

26. The composition of claim 1, wherein the second quencher is $H_3PO_4$.

27. The composition of claim 26, wherein the epoxy-functional styrene(meth)acrylic polymer comprises
(i) at least one epoxy-functional alkyl acrylic monomer and
(ii) at least one functional or non-functional styrenic monomer.

28. The composition of claim 27, wherein the epoxy-functional styrene (meth)acrylic copolymer comprises at least one epoxy functional (meth)acrylic monomer and at least one non-functional styrenic monomer.

29. A process to prepare a stabilized thermoplastic resin composition comprising: a substituted or unsubstituted polycarbonate, a substituted or unsubstituted polyester and a combination of first and second quenchers, wherein the first quencher is an epoxy-functional styrenic (meth)acrylic copolymer, and the second quencher is selected from the group consisting of phosphorus compounds, carboxylic acid derivative compounds, polyols, and boron compounds, wherein said process comprises the steps of: a. melting said polycarbonate and polyester to form a molten mixture; b. extruding said molten mixture in an extruder to form an extrudate; and c. molding said extrudate, and further comprises the step of adding the combination of the first and second quenchers prior to completion of molding step c, wherein the first and second quenchers are added in an amount of from 0.01 to 0.05 percent by weight.

30. The process according to claim 29, further comprising the step of pelletizing the extrudate.

31. The process according to claim 29, wherein said melting is carried out at in temperature range between about 225° C. and about 30° C.

32. The process according to claim 29, wherein said extruding is carried out at a temperature range between about 200° C. and about 25° C.

33. The process according to claim 29, wherein said melting is carried out in presence of a catalyst.

34. The process according to claim 33, wherein said catalyst is selected from the group consisting of alkali metal and alkaline earth metal salts of aromatic dicarboxylic acids, alkali metal and alkaline earth metal salts of aliphatic dicarboxylic acids, Lewis acids, metal oxides, their coordination complexes and mixtures thereof.

* * * * *

UNITED STATES PATENT AND TRADEMARK OFFICE
CERTIFICATE OF CORRECTION

PATENT NO. : 7,256,228 B2  Page 1 of 1
APPLICATION NO. : 10/814971
DATED : August 14, 2007
INVENTOR(S) : Agarwal et al.

It is certified that error appears in the above-identified patent and that said Letters Patent is hereby corrected as shown below:

Column 21, Claim 5, Line 17 should read: -- diol or cycloaliphatic diol and at least one aromatic acid, --

Column 23, Claim 31, Line 16 should read: -- 225° C. and about 300° C. --

Signed and Sealed this

Thirtieth Day of October, 2007

JON W. DUDAS
*Director of the United States Patent and Trademark Office*